A. CALLESON.
CAN HEADING AND SHAPING MACHINE.
APPLICATION FILED DEC. 30, 1911.
1,168,477.
Patented Jan. 18, 1916.
7 SHEETS—SHEET 3.
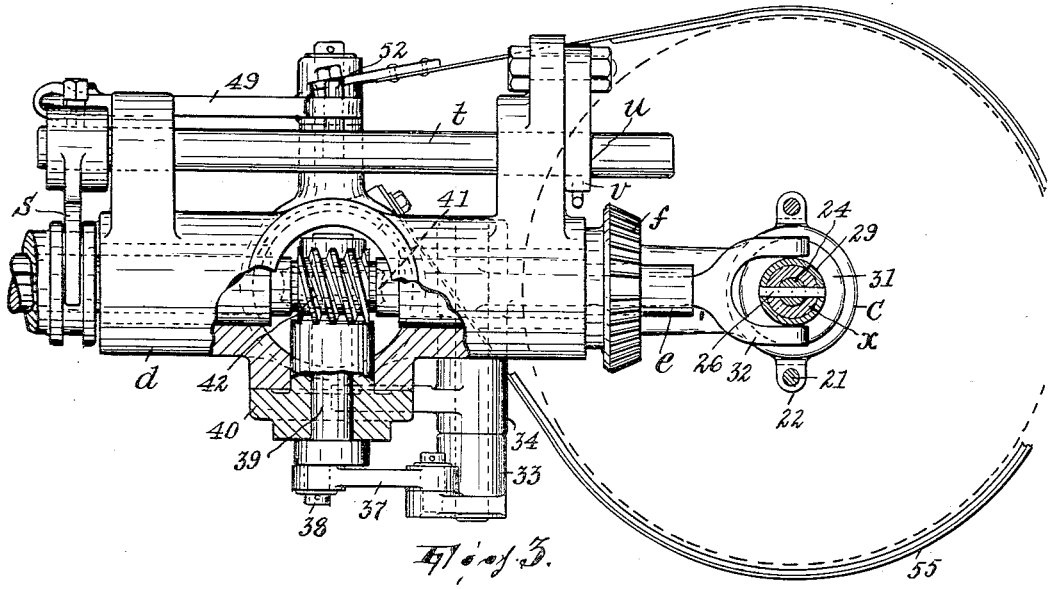
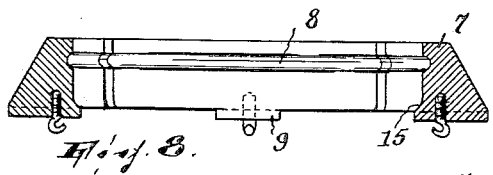
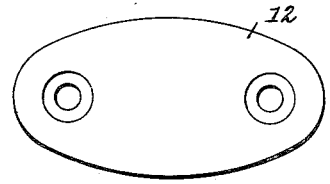
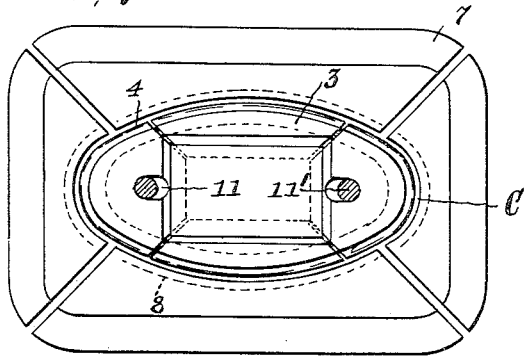
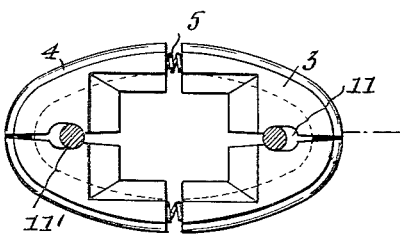
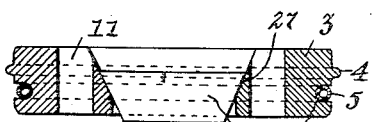
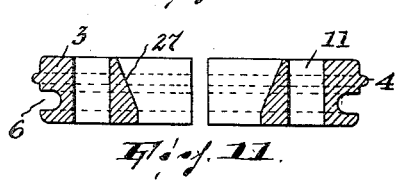
WITNESSES
INVENTOR
AMOS CALLESON.
BY
ATTORNEY.

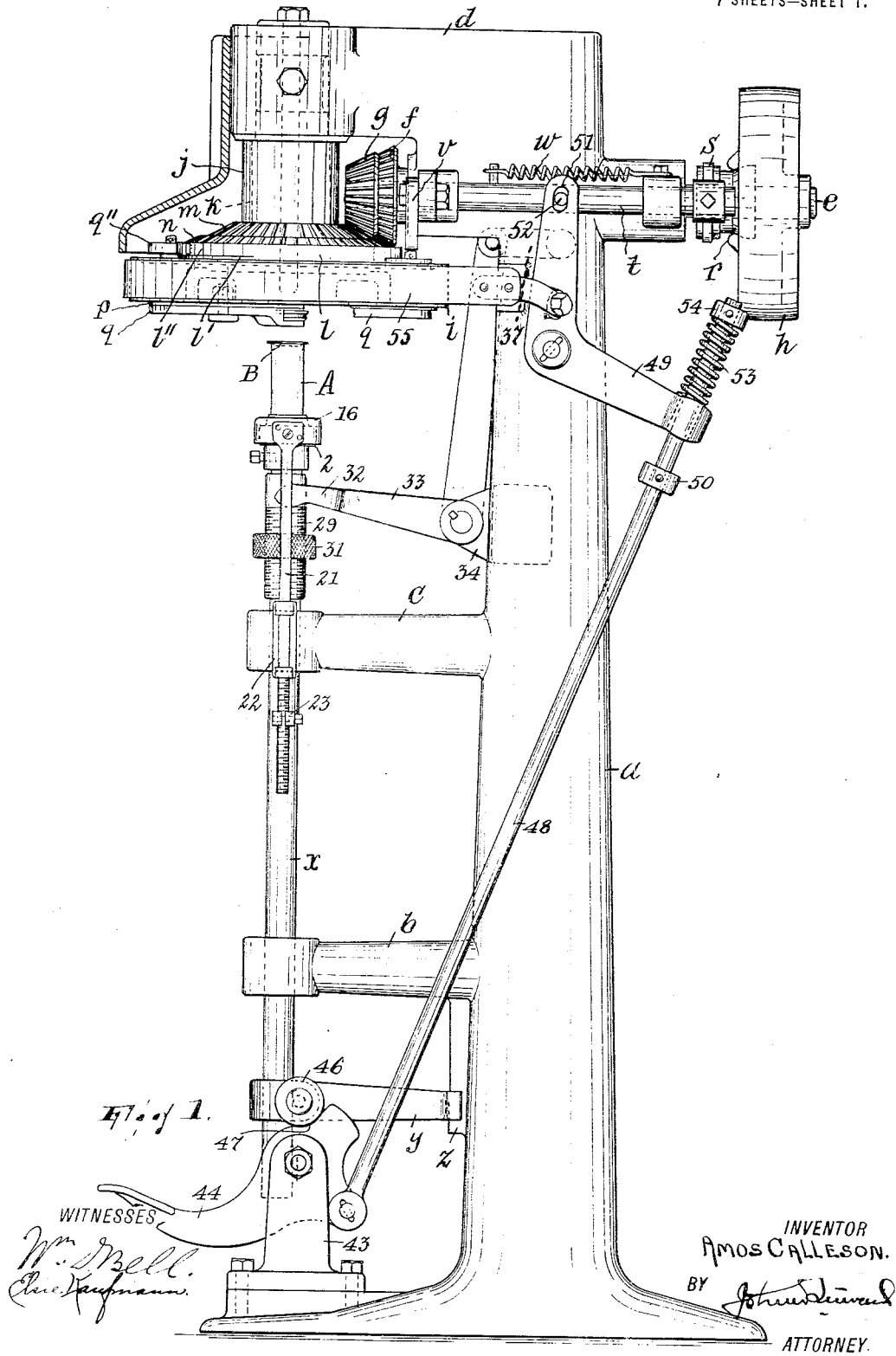

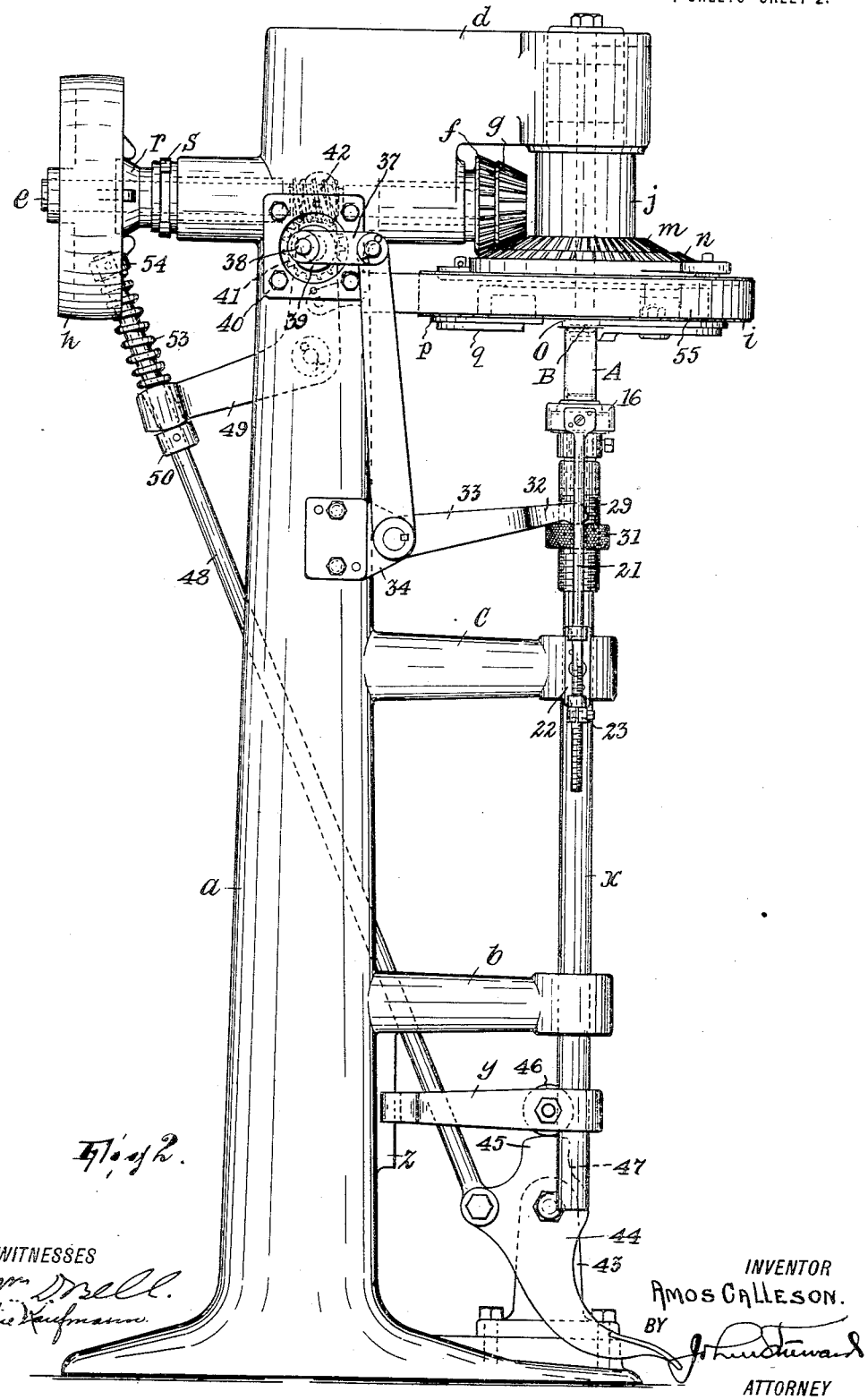

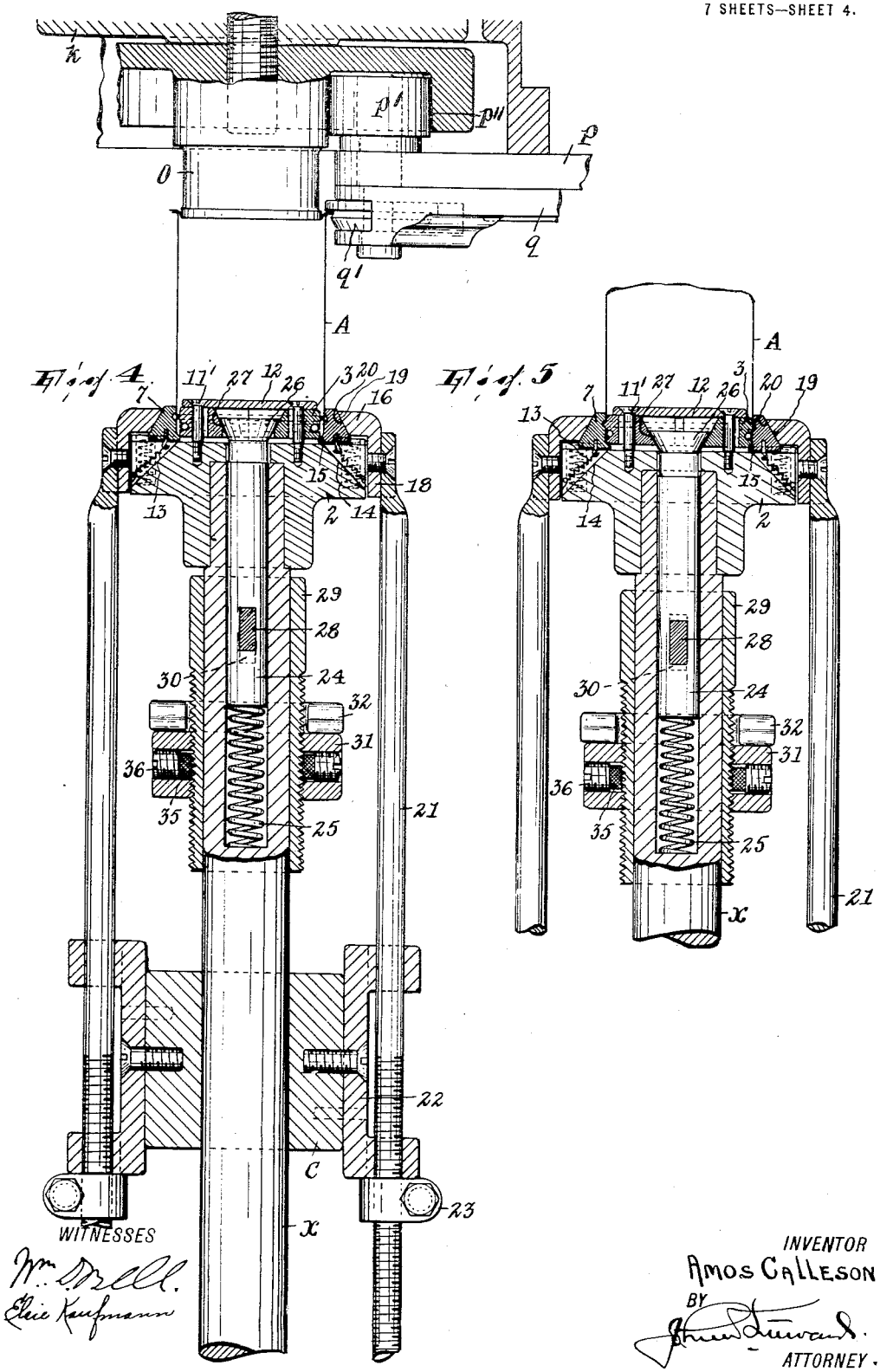

A. CALLESON.
CAN HEADING AND SHAPING MACHINE.
APPLICATION FILED DEC. 30, 1911.
1,168,477.
Patented Jan. 18, 1916.
7 SHEETS—SHEET 5.
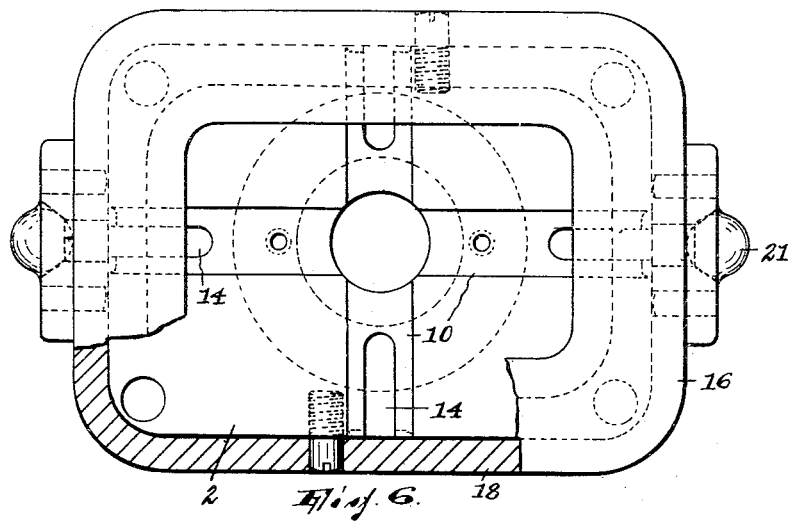
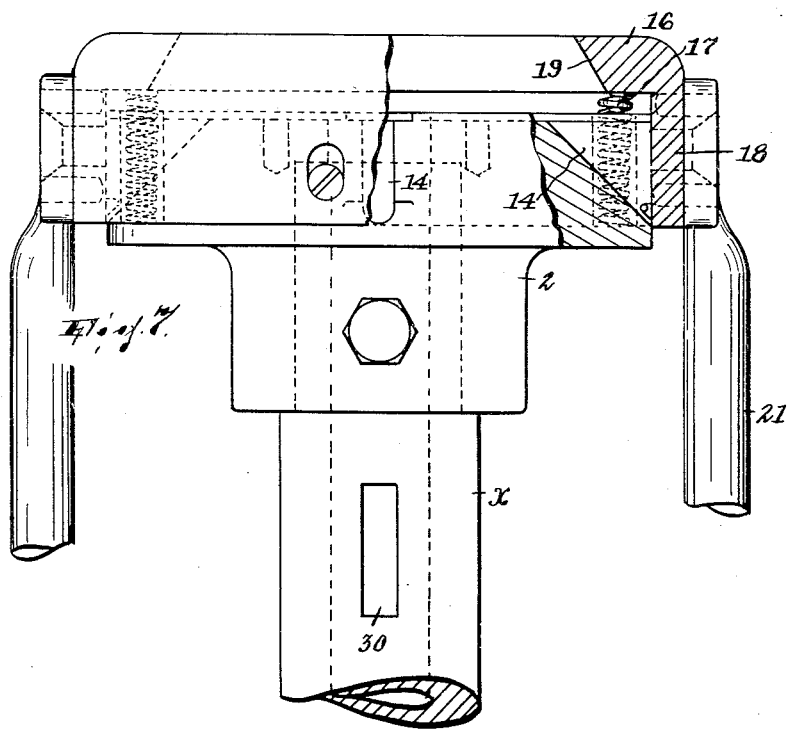
WITNESSES
INVENTOR
Amos Calleson.
BY
ATTORNEY.

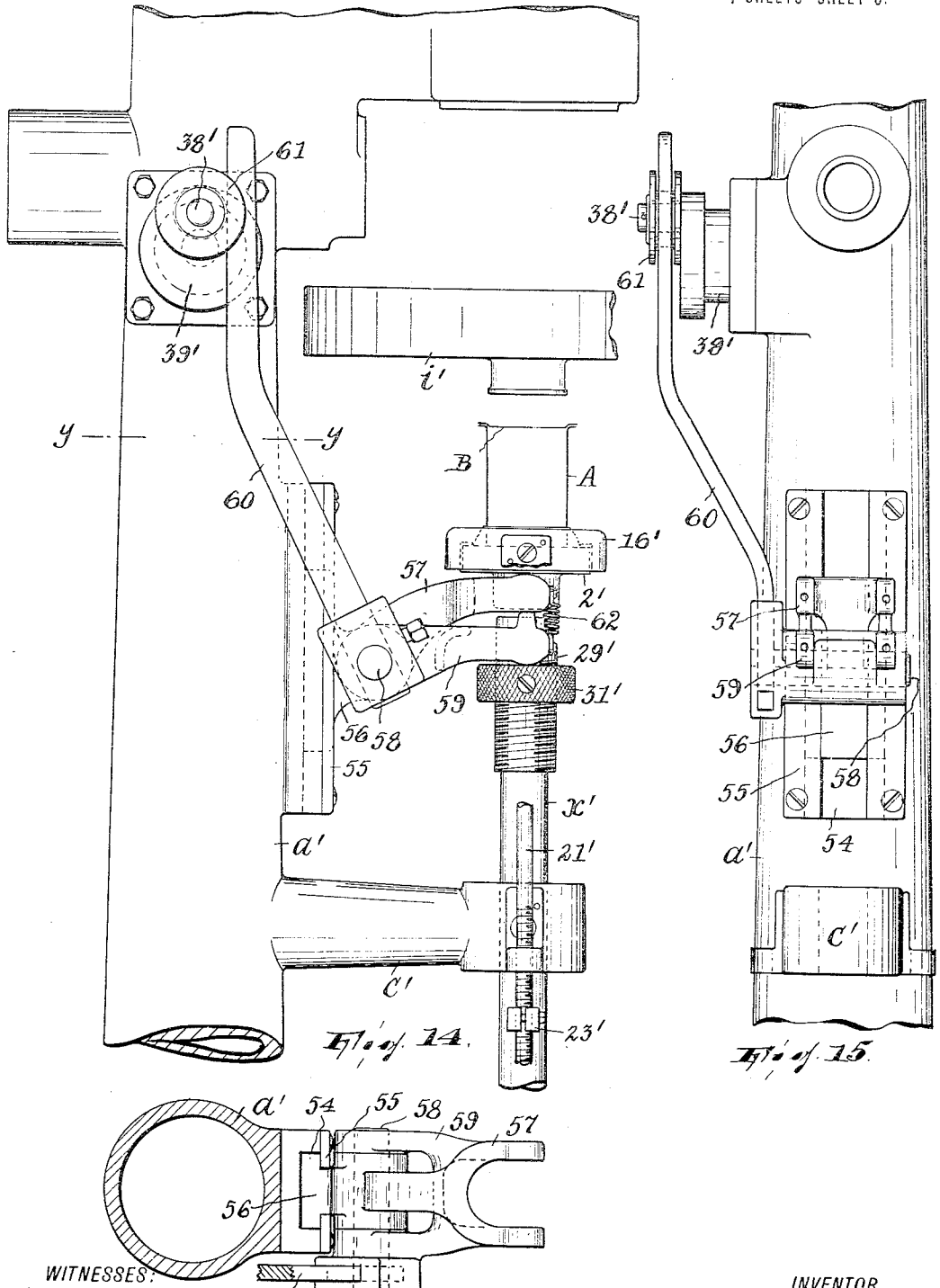

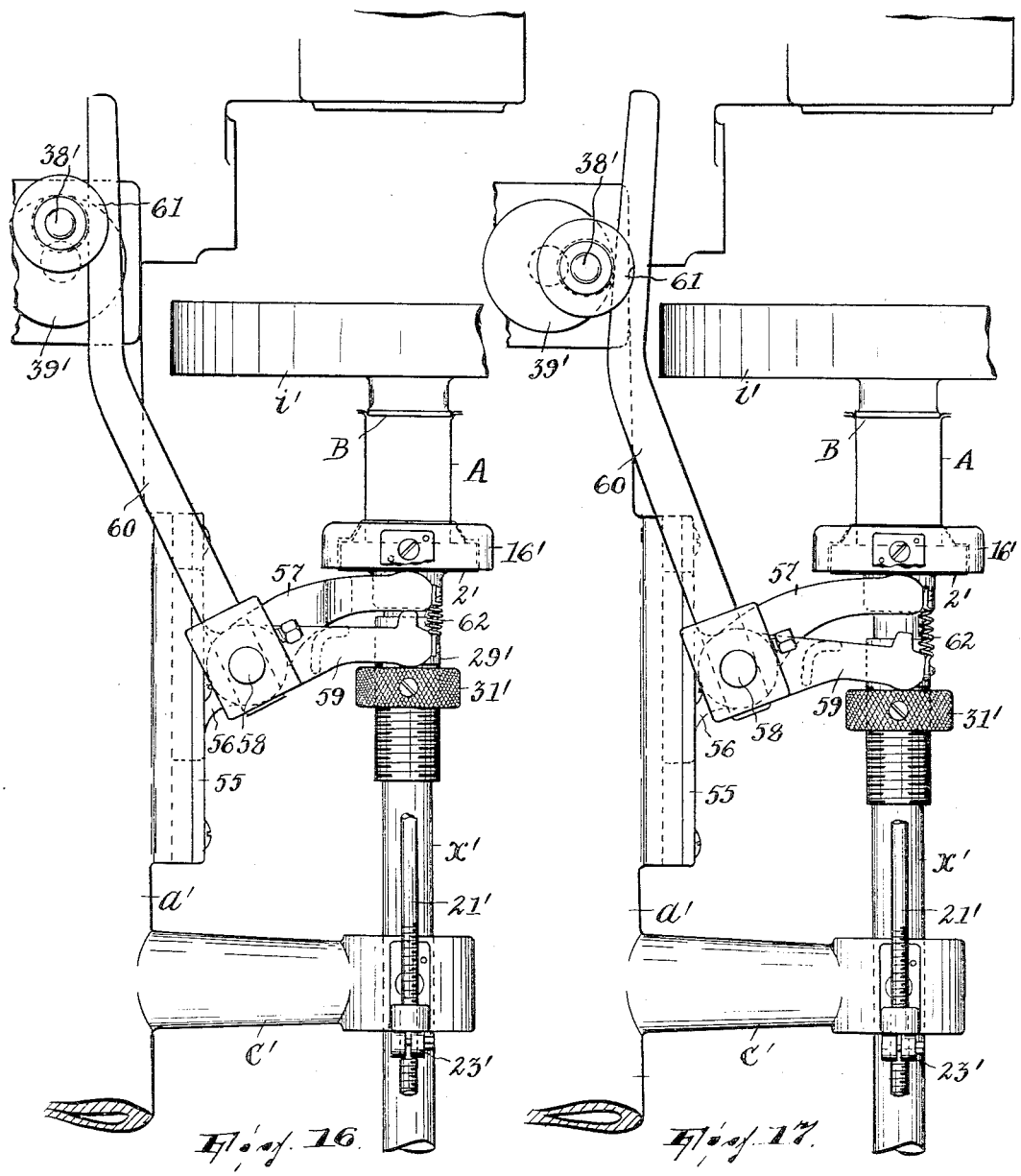

UNITED STATES PATENT OFFICE.

AMOS CALLESON, OF BROOKLYN, NEW YORK, ASSIGNOR TO BENJAMIN ADRIANCE, OF BROOKLYN, NEW YORK.

CAN HEADING AND SHAPING MACHINE.

1,168,477.  Specification of Letters Patent.  Patented Jan. 18, 1916.

Application filed December 30, 1911.  Serial No. 668,793.

*To all whom it may concern:*

Be it known that I, AMOS CALLESON, a citizen of the United States, residing at Brooklyn, in the county of Kings and State of New York, have invented certain new and useful Improvements in Can Heading and Shaping Machines, of which the following is a specification.

This invention relates to machines for forming sheet metal and the like cans or other vessels and particularly to that class of machines wherein in a single organism means is employed whereby in each cycle of operation thereof a head may be attached, as by seaming, to one end of the vessel and some such shaping of the other end thereof effected as the forming of a bead or the expanding or contracting of the said other end.

The object of the invention being to provide means for performing the operations named quickly, with increased facility and efficiency and in a way calculated to produce a superior product, the invention consists, first, in a novel combination of means for performing these two operations, second, in a novel means for performing the operation of shaping the open end of a cylindrical body; and, third, in a novel mechanism for applying the power necessary to operate on a vessel or the like.

In the accompanying drawings, illustrating one adaptation of the invention, Figures 1 and 2 are views in elevation showing the machine from the front and rear sides thereof, respectively; Fig. 3 is a plan view of the machine, certain parts appearing in section and others broken away; Fig. 4 shows, partly in side elevation and partly in section, the means for clamping the vessel, the seaming means operative on one end thereof and the means for shaping the other end thereof, the vessel being shown in position; Fig. 5 is a view partly in elevation and Fig. 5 is a view partly in elevation and partly in section, illustrating the parts for shaping the other end of the vessel (which also appears in this figure) in their acting positions; Figs. 6 and 7 are a plan and front elevation, each partly in section, of the elevatory support for the vessel, certain parts being removed; Figs. 8 and 9 are, respectively, a vertical sectional view and a plan view of the sectional female die member, the male die also appearing in Fig. 9;

Fig. 10 shows the sectional male die member in vertical section and a fragment of its actuating means in elevation; Figs. 11 and 12 are, respectively, a sectional, and a plan view of the male die member; Fig. 13 is a plan view of a plate which overlies the male die member; and, Figs. 14 to 18 are views illustrating a modified form of means whereby the male die member is controlled, Fig. 14 being a side elevation and Fig. 15 a front elevation thereof, the parts being in the idle position; Figs. 16 and 17 being side elevations showing the parts in the position they occupy after the cam has been clamped and, respectively, before and after the male die member has been caused to coöperate with the female die member to shape the can; and, Fig. 18 being a horizontal sectional view on substantially the line $y$—$y$ of Fig. 14.

The pedestal $a$ having the laterally projecting arms $b$, $c$ and $d$; the rotary shaft $e$ journaled in said pedestal and carrying at its inner end the bevel-pinions $f$, $g$ and on its outer end the going part in the form of a loose pulley $h$; the rotary disk $i$ having the hub or sleeve $j$ journaled on the post $k$ depending from the arm $d$; the cam-ring $l$ having the cams $l'$ and $l''$ and revolubly arranged on the disk $i$; the bevel gears $m$ and $n$ respectively fixed to the disk $i$ and cam-ring $l$ and meshing with the pinions $g$ and $f$; the chuck or upper member $o$ for clamping the vessel in position while being operated upon, the same being secured to the post $k$; the pairs of levers $p$, $q$, the former being caused to follow the general outline of the vessel being operated upon by virtue of its roller $p'$ running in a cam groove $p''$ (Fig. 4) and the latter ($q$) being pivoted in lever $p$ and carrying at one end a seaming roller $q'$ and at the other end a roller $q''$ adapted to be actuated by one of the cams $l'$, $l''$; the clutch $r$ controlled by a fork $s$ on the rod $t$ arranged to slide in the pedestal $a$ longitudinally and parallel with shaft $e$ and notched at $u$ (Fig. 3); the pivoted spring actuated catch $v$ adapted to engage in said notch $u$ and hold rod $t$ in the position where the clutch is "closed"; and the spring $w$ normally pulling rod $t$ in the direction to release or "open" the clutch when, at the end of each cycle of movement of the parts, the stud on which the roller $q''$ of one of the levers $q$ is journaled trips the catch $v$, are or may be all substantially the same in construction and operation as the corresponding parts shown in U. S. Letters Patent No. 810,245, issued January 16th, 1906.

In the present instance, the vessel A to be operated upon (being a sheet metal can, elliptical in plan) has one end B (its bottom) attached thereto by a double seaming operation, performed by the pairs of levers $p$, $q$ and at the same time, or at least, as a part of the same operation has the edge thereof forming its other end turned inwardly slightly convergently (to facilitate the application thereto of a slip-cover) and formed with an external bead or shoulder with which the edge of such cover coincides when the same is in place.

Proceeding now to describe the mechanism whereby the edge at the mouth of the can or vessel A is turned inwardly and the bead is formed, $x$ is a shaft or spindle sliding vertically in the arms $b$, $c$ and provided with a forked arm $y$ engaging a fin $z$ on the pedestal $a$ which prevents the shaft from turning; fixed to and surmounting this shaft is a head 2 (Figs. 6 and 7) which supports a sectional male die member 3 having a surrounding bead 4 and its parts or sections, normally held collapsed or contracted by a spiral spring 5 or other elastic device fitted to a groove 6 in the die member, and a sectional female die member 7 having an internal groove 8 coinciding and mating with the bead 4 of the male die member. (Figs. 8 to 12.) There are preferably four parts or sections to each of these dies and the parts or sections are radially movable upon the flat top surface of the head 2 to expand or contract each die member (3 and 7), each section of the female die member 7 preferably having a depending lug 9 received by a guide-way 10 cut in the top of the head 2 and the die member 3 being penetrated by vertical slots 11 receiving screws 11′ on the head whereby a plate 12 is held superimposed upon the male die member. The parts or sections of the female die member are normally held open or expanded by spiral springs 13 connecting the sections respectively with suitable points in the head 2, which is recessed at 14 for their reception.

In the open position of the die structure, the edge of what is to form the mouth or top of the can may be freely entered into the continuous recess C (Fig. 9) formed between the die members, and upon the sections of the die members being caused to squeeze the interposed edge-portion of the can as hereinafter described the mating bead 4 and groove 8 of said die members will produce the desired bead or shoulder near said mouth of the can. In order to turn inwardly, convergently, the edge of the mouth of the can, the sections of the die member 7 are formed with an internal convergent shoulder 15 (Fig. 8) whose manner of operating to this end will later be explained. In introducing the can into the die structure, this shoulder 15 forms a stop or gage marking the limit to which the can should be introduced.

The female die member is contracted against the tension of the springs 13 as follows: An apertured plate 16, surmounting the die member 7, rests upon spiral springs 17 housed in the head 2, and it has a depending flange 18 surrounding the head. The plate 16 and the die member 7 are provided with coacting cam-faces 19 and 20 converging upwardly, so that when the plate is depressed the die member will be contracted. Depending from the flange of the plate are the threaded rods or stirrups 21 which penetrate yokes 22 secured to the arm $c$ of the pedestal, said yokes forming stops for the engagement therewith of collars 23 secured adjustably on the rods below said yokes. When the shaft $x$ is elevated said shaft and the chuck $o$ form members for clamping the can A between them, the mouth of the can having been previously introduced into the die, as described, and its bottom-forming head B superimposed thereupon. As the shaft $x$ rises and brings the head B of the can against the chuck $o$, the collars 23 engage the stops afforded by the yokes 22 and hold the plate 16 against further upward movement, so that the sections of female die member are wiped inwardly and said die member is contracted, the vertical pressure and the radial pressure exerted on the can by the female die member at its convergent shoulder 15, turning the edge at the mouth of the can inwardly, convergently.

The male die member is expanded against the tension of its spring 5 as follows: Housed in the upper end of the shaft $x$ is a vertically movable spindle 24 seated upon a spiral spring 25 and having a conical head 26 received by a conical recess 27 in the male die member, the contiguous faces of the head 26 and the recess 27 forming cam-faces converging downwardly. A flat pin 28 penetrates the spindle 24 and a sleeve 29 sliding vertically on the shaft $x$, the said pin fitting the spindle and sleeve snugly but being movable vertically in the shaft in a slot 30 therein. The sleeve 29 is externally threaded and has screwed upon it an adjustable collar or nut 31 upon which may impinge the fork 32 of a bell-crank lever 33 fulcrumed in a bracket 34; to hold the nut 31 against turning, it houses fiber blocks 35 which impinge upon the external threading of the sleeve, being pressed against the same by screws 36, tapped into the nut. The bell-crank lever 33 has its free arm connected by a link 37 (Figs. 2 and 3) with a crank-pin 38 on a shaft 39 journaled in a block 40 secured to the pedestal $a$ and carrying a worm-wheel 41 (Fig. 2) meshing with a worm 42 on the shaft e. Upon each cycle of movement of the shaft 39 the bell-crank lever completes one oscillatory movement and acting at that time to depress sleeve 29, and consequently spindle 24, it causes the male die to expand, whereby the bead 4 on the latter forces the interposed metal of the can into the groove 8 of the already contracted female die member, producing the bead or shoulder on the cam.

The control of the operations above described, so that they will all occur in a single cycle of the moving parts, is effected as follows: In a bracket 43 fixed to the pedestal is fulcrumed a lever or foot treadle 44 having a hump 45 and therefore including a cam, the said cam being engaged by a roller 46 journaled in the arm y and the said hump being adjoined, on the side thereof the nearer to the operating end of the lever, by a recess 47 in which the roller rests in the idle position of the parts. When the treadle is depressed, the shaft x is raised, clamping the cam between the chuck and the head of the shaft and causing the contraction of the female die member. Pivotally connected to the lever is a rod 48 which penetrates one end of a bell crank lever 49 and carries a collar 50 adapted to abut against said arm; the other arm of the bell-crank lever has a slot 51 receiving a pin 52 on the rod t. The movement imparted to the rod 48 by the lever 44 is of greater amplitude than the movement allowed the portion of lever 49 which is penetrated by the rod, wherefore a cushioned lost-motion of the rod with respect to the lever 49 when the parts are returned from the position shown in Fig. 2 to that shown in Fig. 1 is permitted by a spiral spring 53 coiled about the rod between the lever 49 and a collar 54 on the end of the rod.

As in the patent aforesaid, so in the present instance, a brake-band 55 is attached at one end of the pedestal a and at the other end to the lever 49, surrounding the disk i and stopping its rotation immediately upon cutting off the power.

Operation: The pulley h is supposed to be rotated continuously by a suitable belt. In the position of the parts shown in Fig. 1, the clutch is "open," disk i being stationary and shaft x depressed, its roller 46 resting in the recess 47 of treadle 44. The can a, with its superimposed head, is introduced into the die structure, as described. The treadle is now depressed, which operation raises the shaft x and effectuates the clamping of the can and the contraction or squeezing action of the female die member, accompanied by the forming of the bead in and the turning in of the edge of the mouth of the can. When collar 50 moves bell-crank lever 49 in the raising of lever 48 resulting from depressing the treadle, the lever moves rod t to the left in Fig. 1 until it is caught and held against return by the catch v, in which position of rod t the clutch will be "closed." The shaft e will now rotate, and the consequent rotation thereof and of disk i and cam-ring l will cause the double seaming operation to be performed on the bottom-forming portion of the can and, during such double-seaming operation, the fork 32 of lever 33 to be depressed, effecting the depression of the spindle 24 and the consequent expansion of the male die member so that the latter will coact with the female die member to produce the bead or shoulder at the mouth of the can, this operation occurring while the shaft is positively supported on the hump 45 of the lever in direct line with the lever fulcrum.

When the disk i has performed one complete cycle of rotation, the catch v is tripped and releases rod t which, under the pull of spring w, returns to its original position, opening the clutch and moving lever 49, so that the brake-band 55 operates to stop immediately the operations attendant upon the rotation of shaft e; the return movement of lever 49 shifts the treadle lever sufficiently so that its hump passes from beneath the roller 46, whereupon the weight of shaft x and the parts it carries completes the return movement of the lever involving lost-motion between parts 48 and 49 and taken up by the spring 53. The parts having now all resumed their initial positions, the die is open and the can may be removed.

In Figs. 14 to 18, the mechanism comprising parts a', c', i', x', 2', 16', 21', 23', 29', 31', 38' and 39' is or may be all substantially the same as the mechanism comprising the corresponding parts a, c, i, x, 2, 16, 21, 23, 29, 31, 38 and 39 already described.

In guideways 54 formed on the pedestal by the strips 55 is arranged to move vertically a slide 56 having a rigid projecting fork 57 which bears against the underside of the head 2' on shaft x'. A rock-shaft 58 is journaled in the fork 57 and forms the fulcrum for a lever one arm 59 of which is forked and stands interposed between the fork 57 and the collar or nut 31' and the other arm 60 of which bears against the grooved periphery of a roller 61 on the crank-pin 38'. In the idle position, the slide will be substantially in the position shown in Fig. 14. When the treadle is depressed and raises shaft x', the slide is elevated correspondingly. (Fig. 16). The can being now clamped, upon shaft 39' rotating the crank-pin 38', the lever is turned on its fulcrum, causing arm 59 of the lever to force downward the collar 31' so that the male die member (controlled from 31') is made to coact with the female die member in the manner already described (Fig. 17). A spring 62 connecting the fork 57 with the arm 59 of the lever, returns said arm into engagement with the fork as soon as the pressure on the lever is relieved, and when the treadle is returned to its rest position, the slide and the parts it carries resume the position shown in Fig. 14.

Having thus fully described my invention, what I claim as new and desire to secure by Letters Patent is:—

1. In combination, the frame, means for clamping the vessel including a chuck and a plunger movable toward the chuck, means, movable around the chuck, for operating on the chuck-end of the vessel, a die-member carried by, and having expansion and contraction movements radially of the thrust-line of, the plunger, and means, relatively to which said plunger and die-member are movable toward the chuck and engageable by the die-member during such movement, for effecting one of said radial movements of the die-member, substantially as described.

2. In combination, the frame, a plunger movable therein, a contractible female die-member carried by the plunger, a die-member-actuating member carried by the plunger and movable against the frame, one of said members having a cam-surface impingible by the other and disposed obliquely to the thrust line of the plunger, an expansible male die-member carried by the plunger within the female die-member, and means for expanding the male die-member, substantially as described.

3. In combination, the frame, a plunger movable therein, expansible and contractible die members coactive with each other to grip the opposite faces of the edge portion of the can and carried by and movable with the plunger, means, movable with the plunger and also relatively thereto independently of said die member but having its movement with the plunger limited by the frame, for moving one die member toward the other, and means for thereupon moving the other die member toward the already-moved first-named die member, substantially as described.

4. In combination, the frame, a plunger movable therein, a vessel-inclosing contractible die-member carried by the plunger, a vessel-inclosed expansible die-member also carried by the plunger, means, movable with the plunger but limited in such movement by the frame, for actuating one of said die-members, and means for actuating the other die-member, substantially as described.

5. In combination with the frame, clamping members for the vessel adapted respectively to receive the vessel ends, one of said members being movable and including squeezing mechanism, and means, movable with the movable clamping member but having its movement therewith limited by the frame, for actuating said squeezing mechanism, substantially as described.

6. In combination with the frame, clamping members for the vessel adapted respectively to receive the ends of the vessel, one of said members including squeezing die members adapted to receive between them the edge-portion of the vessel, one of said die members having a convergent impact-seat for the vessel, and means for causing the die-members to squeeze said edge-portion of the vessel upon the clamping of the vessel by the clamping members, substantially as described.

7. In combination, with the frame, a container support including means, movable on the support, for operating on the container, an actuating part for said means exerting pressure thereon toward the support, and means, comprising a thrust-resisting member movable into supporting relation to said support and adapted to assume the thrust imparted thereto by said part, for effecting the pressure-exerting movement of said part, substantially as described.

8. In combination, the frame, a support movable in the frame, means to operate on the container carried by the support, actuating mechanism, and mechanism, comprising a part movable with the support and having its movement with the support limited by the frame, for transmitting actuation to said means from the actuating mechanism, substantially as described.

9. In combination, the frame, a support movable in the frame, means to operate on the container carried by the support, actuating mechanism, and mechanism, comprising a lever slidingly movable with the support, for transmitting actuation to said means from the actuating mechanism, substantially as described.

10. In combination, the frame, a support movable in the frame, means to operate on the container carried by the support, actuating mechanism, and mechanism comprising a lever and a shifting supporting member for the lever engaging the frame, for transmitting actuation to said means from the actuating mechanism, substantially as described.

11. In combination, the frame, a support movable in the frame, means to operate on the container carried by the support, actuating mechanism, and mechanism, comprising coacting parts movable with the support, for transmitting actuation to said means from the actuating mechanism, one of said parts bearing against said support and the other actuating said means and being actuated by the actuating mechanism, substantially as described.

12. In combination, the frame, a support movable in the frame, means to operate on the container carried by the support, actuating mechanism, and mechanism, comprising coacting parts movable with the support, for transmitting actuation to said means from the actuating mechanism, one of said parts bearing against said support and the frame and the other actuating said means and being actuated by the actuating mechanism, substantially as described.

13. In combination, the frame, a plunger movable therein, expansible and contractible die members coactive with each other to grip the edge-portion of the can and carried by and movable with the plunger, means, relatively to which said plunger and die members are movable and engageable by one of said die members during such movement, for effecting the movement of the latter die member toward the other die member, and means for thereupon moving said other die member toward the already-moved first-named die-member, substantially as described.

In testimony whereof I affix my signature in presence of two witnesses.

AMOS CALLESON.

Witnesses:
W. C. HORN,
LOUIS F. STUMPF.